Sept. 28, 1948.　　　　　R. J. WISE　　　　　2,450,030
FACSIMILE TELEGRAPH SYSTEM AND APPARATUS
Filed May 5, 1942　　　　　　　　　　　　　8 Sheets-Sheet 1

INVENTOR
R. J. WISE
BY George J. Craig
ATTORNEY

Sept. 28, 1948.  R. J. WISE  2,450,030
FACSIMILE TELEGRAPH SYSTEM AND APPARATUS
Filed May 5, 1942  8 Sheets-Sheet 2
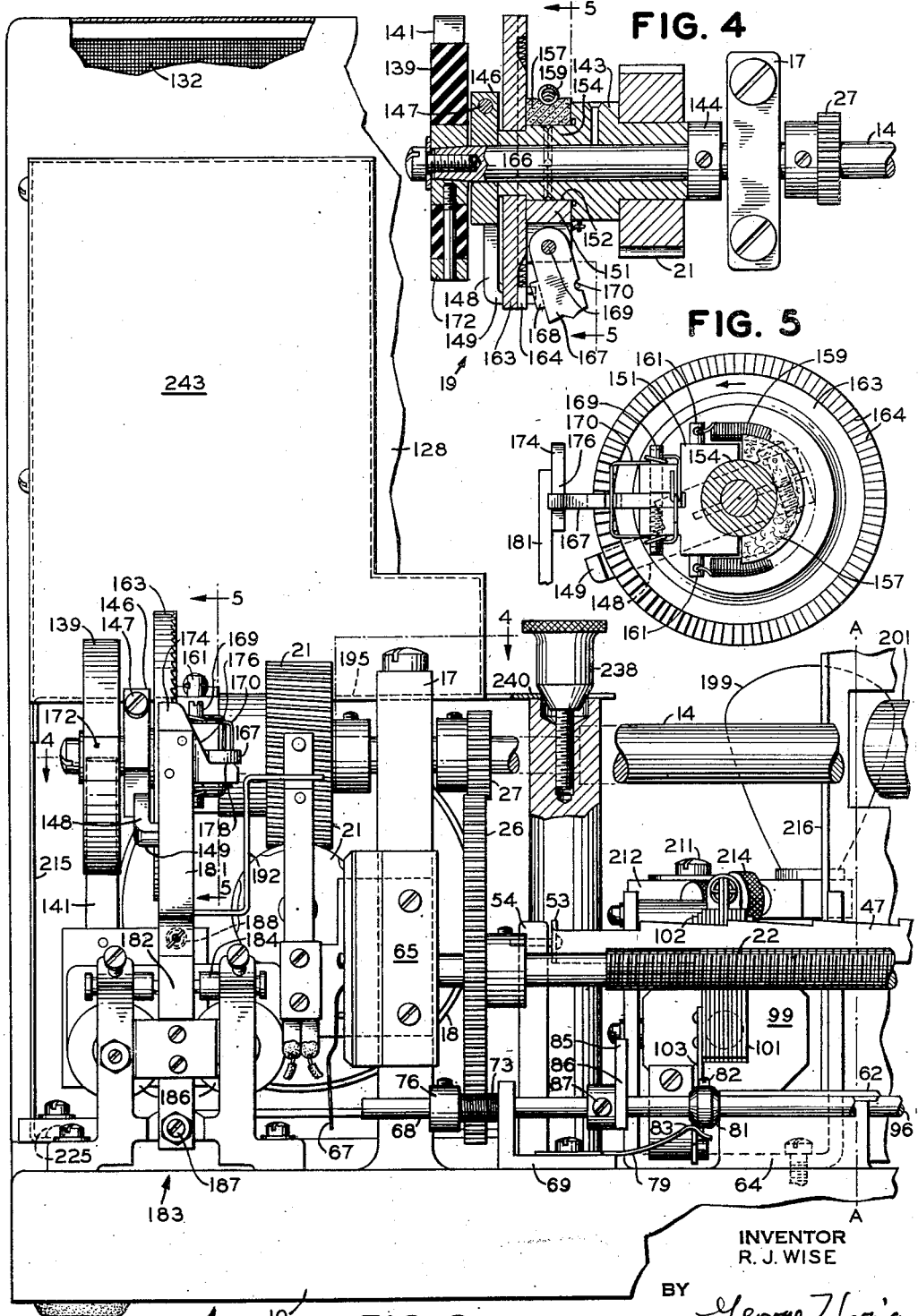
INVENTOR
R. J. WISE
BY George T. Craig
ATTORNEY

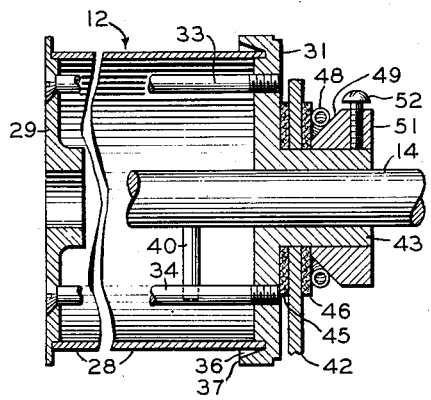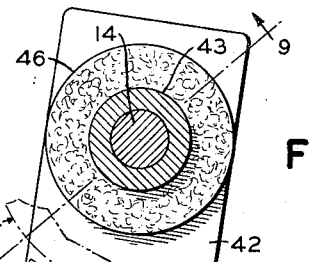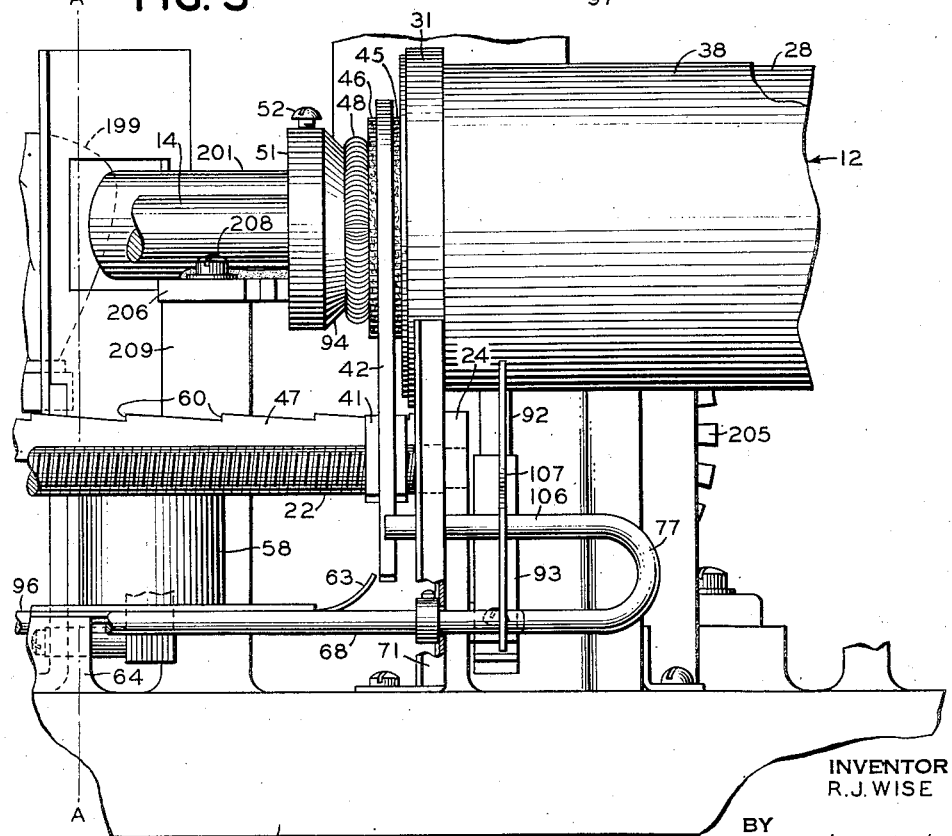

Sept. 28, 1948.　　　　　R. J. WISE　　　　　2,450,030
FACSIMILE TELEGRAPH SYSTEM AND APPARATUS
Filed May 5, 1942　　　　　　　　　　　　　　　8 Sheets-Sheet 4

INVENTOR
R. J. WISE
BY George T. Craig
ATTORNEY

Sept. 28, 1948.     R. J. WISE     2,450,030
FACSIMILE TELEGRAPH SYSTEM AND APPARATUS
Filed May 5, 1942     8 Sheets-Sheet 5

INVENTOR
R. J. WISE
BY George J. Craig
ATTORNEY

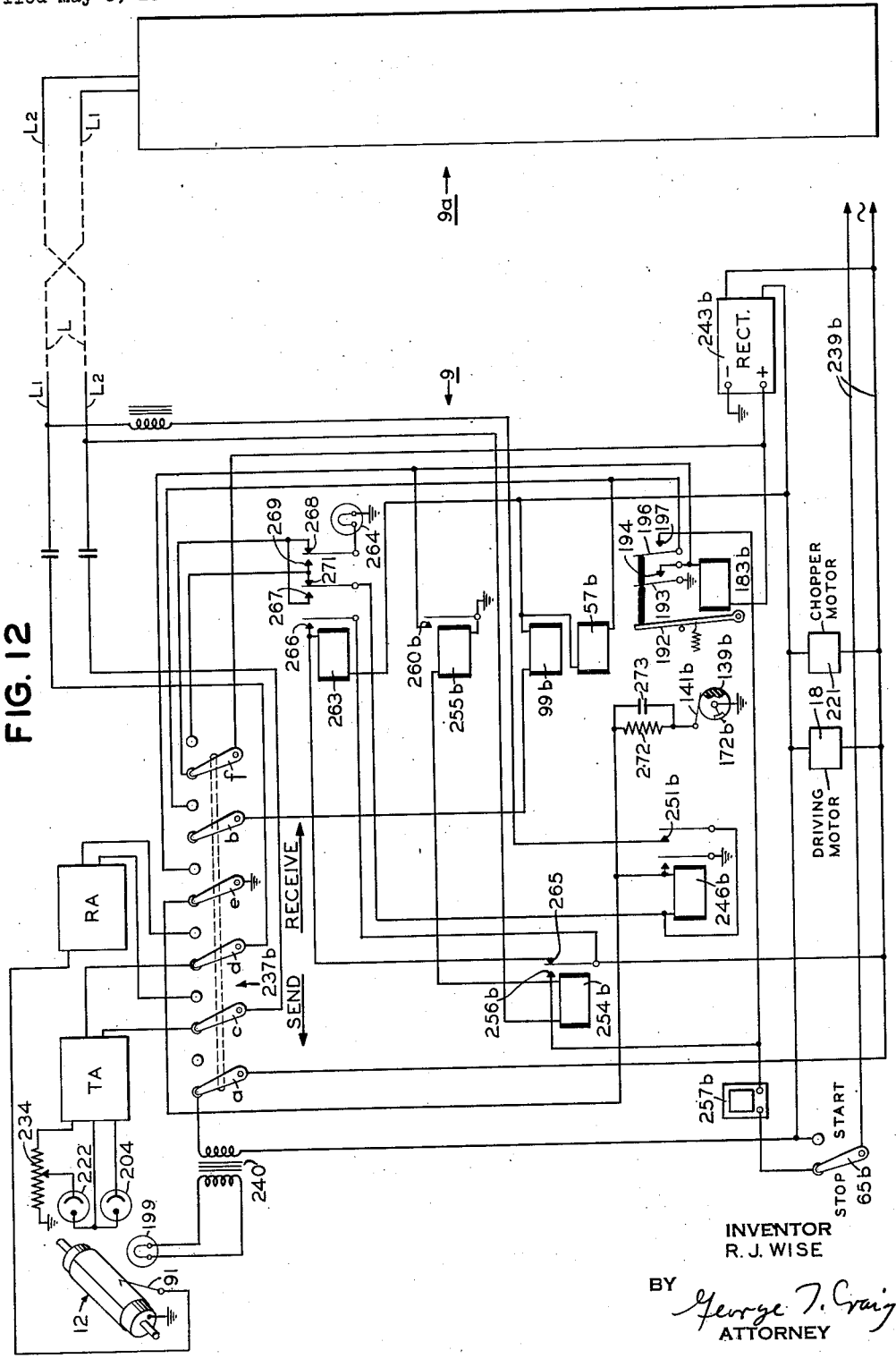

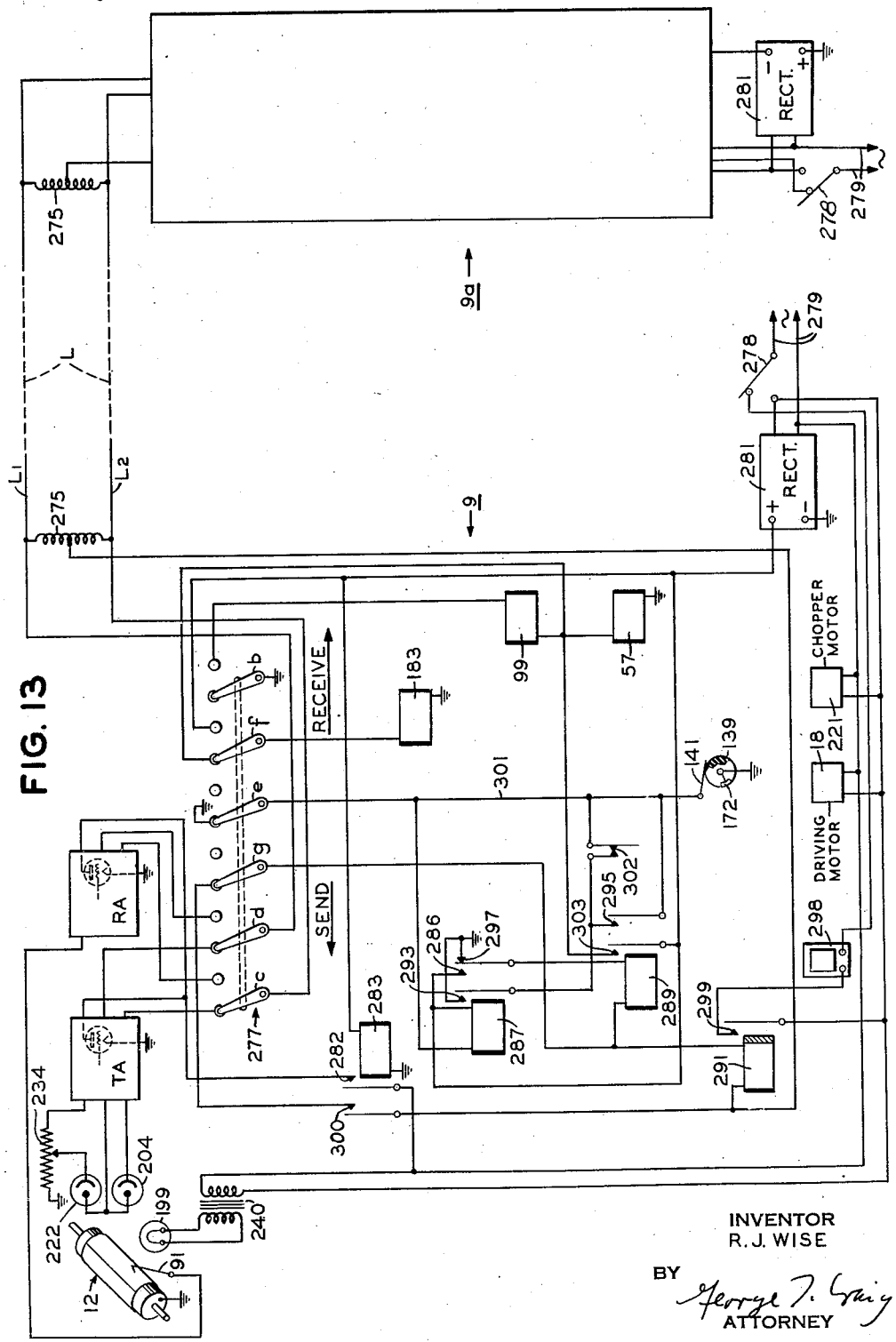

Sept. 28, 1948.                     R. J. WISE                        2,450,030
                        FACSIMILE TELEGRAPH SYSTEM AND APPARATUS
Filed May 5, 1942                                                8 Sheets-Sheet 8
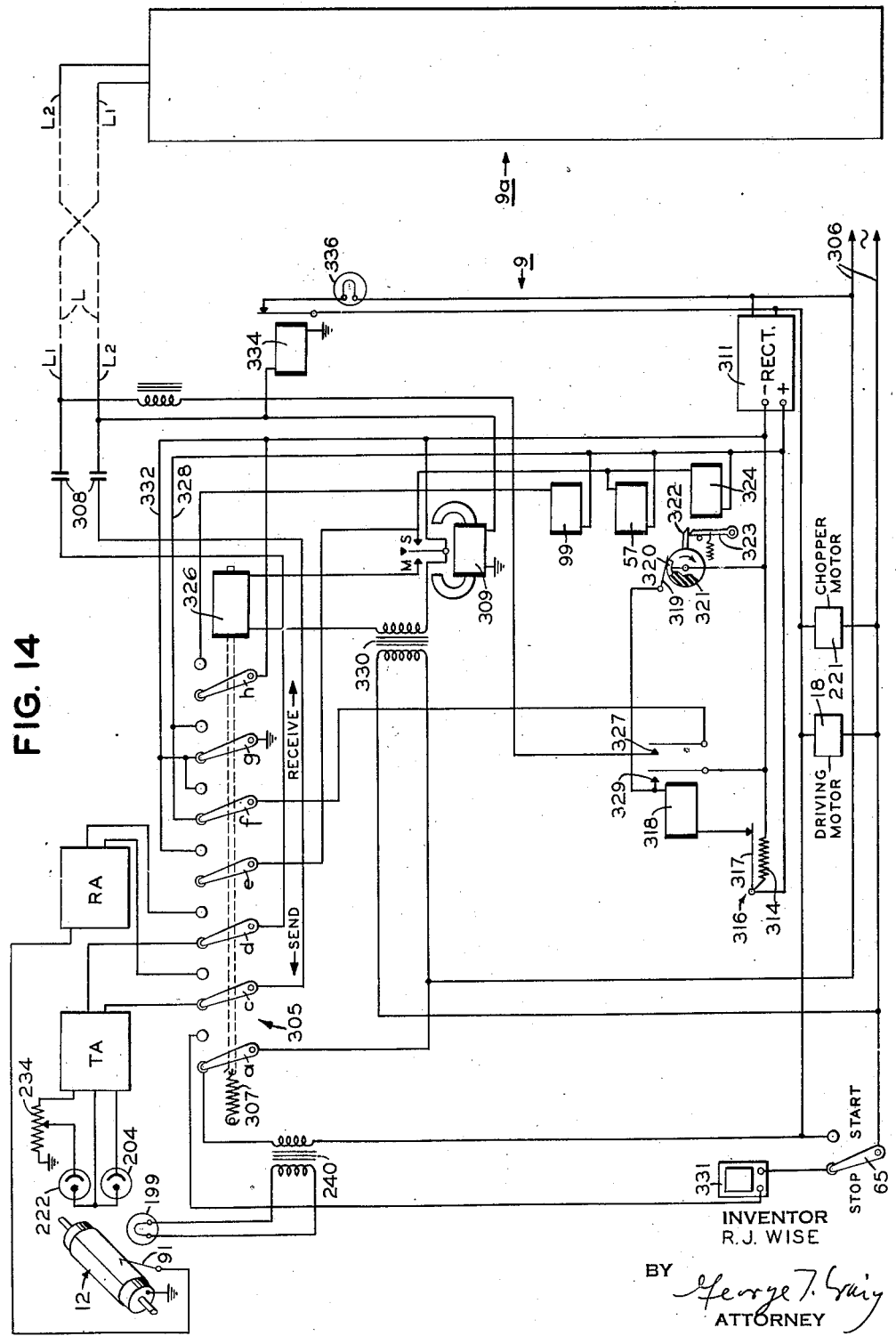
INVENTOR
R.J. WISE
BY George T. Craig
ATTORNEY Patented Sept. 28, 1948

2,450,030

UNITED STATES PATENT OFFICE 2,450,030

FACSIMILE TELEGRAPH SYSTEM AND APPARATUS

Raleigh J. Wise, Dunellen, N. J., assignor to The Western Union Telegraph Company, New York, N. Y., a corporation of New York Application May 5, 1942, Serial No. 441,764

14 Claims. (Cl. 178—6.6)

This invention relates to facsimile telegraph systems and apparatus, and has particular reference to control systems for affording intercommunication between combined transmitters and receivers of similar types.

In a patent to R. J. Wise, Patent No. 2,315,361, issued March 30, 1943, and entitled "System and apparatus for facsimile telegraphy," there is disclosed a combined facsimile transmitter and recorder. In this machine, which may be operated by a comparatively unskilled person, the message sheet is wrapped around an accessible drum and is scanned by a light beam to generate signal currents when the machine is to be used as a transmitter, and by a recording stylus when the machine is to be used as a recorder. The sending and receiving functions and the power supply are under local control, the remaining functions of the machine being initiated from a central office recorder or transmitter, as the case may be. The apparatus at the central station employed with the transmitter-recorder in the above noted copending applicaion embodies features disclosed in a patent to R. J. Wise et al., No. 2,255,868, granted September 16, 1941, and entitled "System and apparatus for facsimile telegraphy." Improvements in facsimile transmitter-recorders such, for example, as those disclosed in the copending application noted above and the novel systems disclosed herein which provide for interconnection of these recorders, are important features of the present invention.

It is one of the objects of the instant invention to provide intercommunication between combined facsimile transmitter-recorders whereby certain of the functions of each of the interconnected machines may be automatically controlled by operations occurring at the other machine.

Another object of this invention is to provide means for conditioning a facsimile machine for operation only when the recording apparatus is in operative condition to receive and record facsimile signals.

A further object of the invention is to provide for inverting the signals generated by a facsimile transmitter in a novel manner.

Still another object of the invention is to provide, in a novel manner, for framing a recorded copy upon a message sheet or other message receiving surface.

A still further object is to provide a mechanical clutch embodying features of design serving to facilitate operation of an interconnected transmitter and recorder whereby the received subject matter at the recorder will be in proper frame or register on a message sheet.

The foregoing and other objects of the invention will appear from the following detailed description of an illustrative embodiment of the invention and several modifications thereof taken in connection with the accompanying drawings, in which:

Fig. 2 is an enlarged front elevational view of a portion of the machine of Fig. 1 ending at the line A—A;

Fig. 3 is a front elevational view of the remaining portion of the machine of Fig. 1 beyond the line A—A, drawn to the scale of Fig. 2;

Fig. 4 is a fragmentary section taken on line 4—4 of Fig. 2, drawn to the scale of Fig. 2;

Fig. 5 is an enlarged fragmentary section taken on line 5—5 of Fig. 2, drawn to the scale of Fig 2;

Fig. 9 is a fragmentary sectional view of the copyholding drum taken in a plane indicated by line 9—9 on Fig. 10, drawn to the scale of Fig. 6;

Fig. 10 is a fragmentary vertical sectional view, the section being taken from the left side of Fig. 1 as indicated by the arrows on line 10—10 of Fig. 1, but drawn to the scale of Fig. 6;

Figs. 12 to 14 are similar to Fig. 11 and illustrate the electrical features of a series of modified systems.

Figure 1:
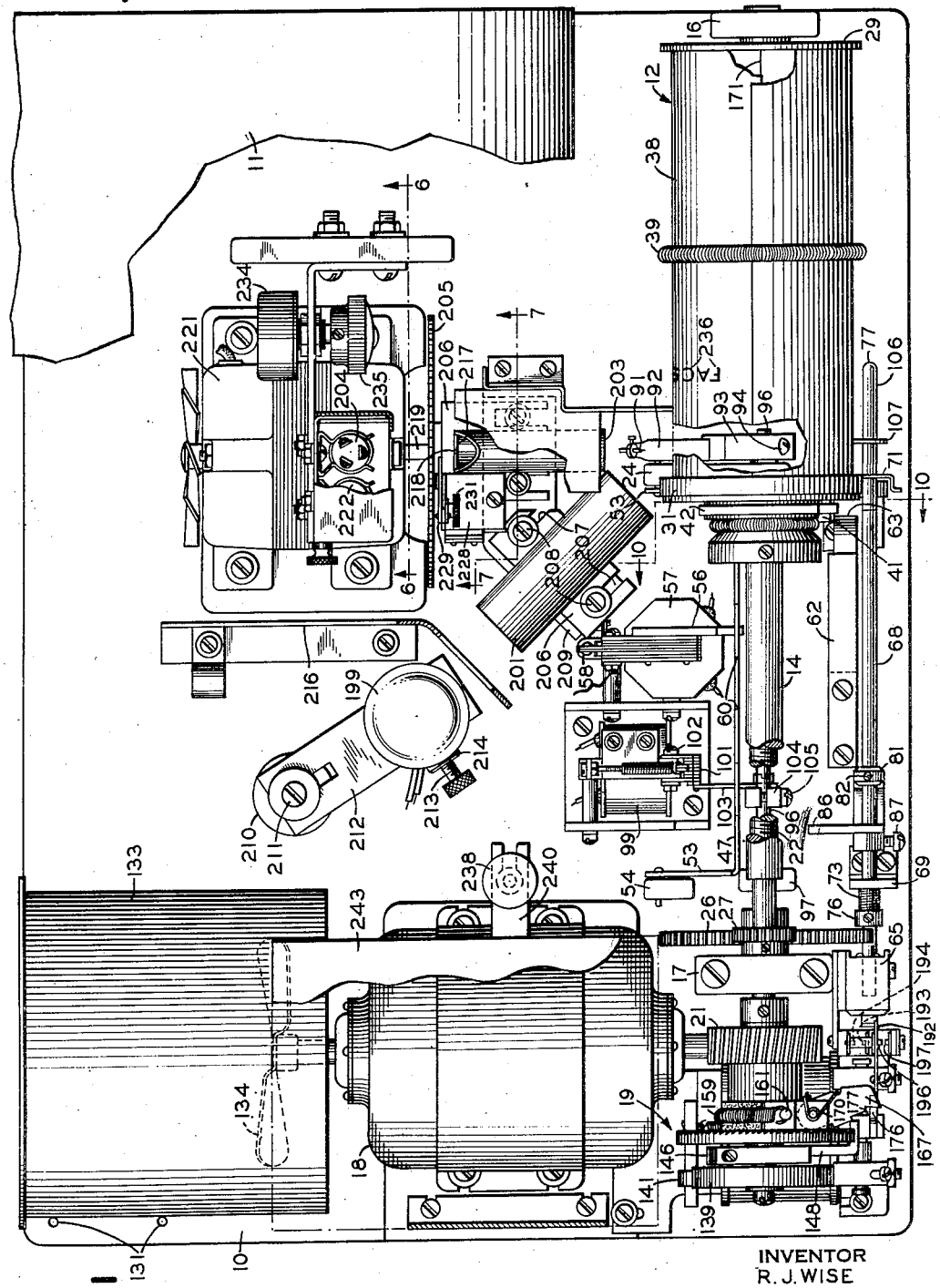
Fig. 1 is a plan view of a combined facsimile transmitter and receiver embodying the invention in a preferred form.
Figure 6:
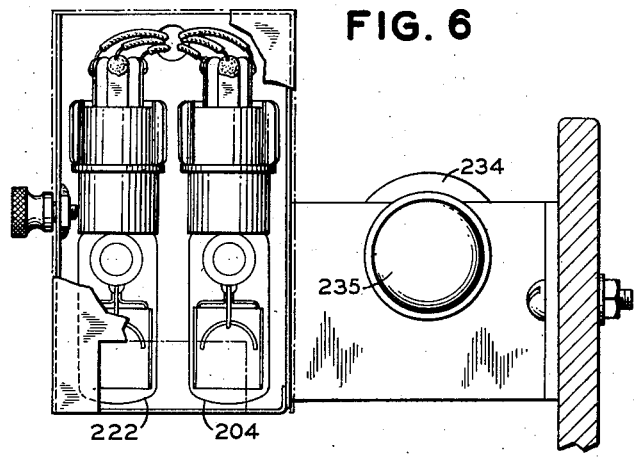
Fig. 6 is a fragmentary view taken partly in section on line 6—6 of Fig. 1, but drawn to a slightly enlarged scale.
Figure 7:
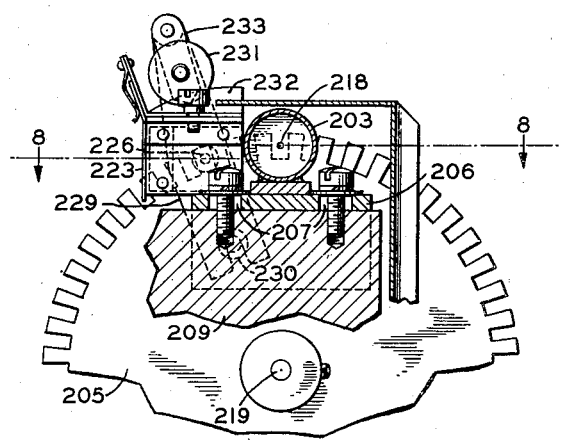
Fig. 7 is a view taken partly in section on line 7—7 of Fig. 1, drawn to the scale of Fig. 6.
Figure 8:
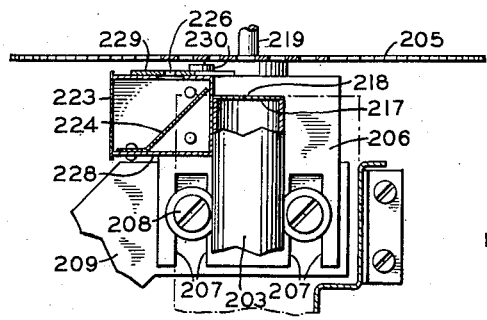
Fig. 8 is a fragmentary section taken on line 8—8 of Fig. 7, drawn to the scale of Fig. 6.

The facsimile systems to be described by way of example are designed to enable the use of a pair of combined transmitters and recorders of the type disclosed in application Serial No. 293,188, above mentioned, at each end of a communication channel or circuit, and to that end these combined machines are modified as disclosed herein in accordance with the invention. A pair of interconnected stations equipped with machines 9 of the present invention shown in Figs. 1 to 10 of the drawings may exchange pictures or messages in facsimile without the necessity of providing any other communication circuit to control the interconnected machines or to exchange information concerning their control. The scanners of the machines to be described include a photocell for generating voltages representing the subject matter to be transmitted and a stylus for recording received subject matter; however, it will be understood that any known type of transmitting or recording device may be used.

In the systems to be described, framing of the received copy in register with the original is obtained by a signal originating at the receiver at the instant the receiver is in fully operative condition. This signal starts the transmitter simultaneously with the receiver, the copyholder portions of the scanners of both machines starting from a predetermined position of rest.

The combined machine 9 disclosed in Figs. 1 to 10 of the drawings will now be described. This machine comprises a base or frame 10, a removable cover 11, a fragmentary portion of which appears in Fig. 1, and a copyholder in the form of a drum or cylinder 12 journaled for rotation on a shaft 14. The shaft is rotatably mounted in brackets 16 and 17 secured to or integral with the base 10. A motor 18, which is adapted for synchronized operation with the motor of an interconnected facsimile machine, imparts driving power to the shaft 14 by way of a clutch, indicated generally by reference character 19, through a worm and worm wheel combination 21. The clutch 19 and its function will be explained in detail hereinafter. A lead screw 22 for advancing the cylinder 12 is journaled in the brackets 17 and 24. It is driven by a gear 26 in mesh with a pinion 27 secured to the shaft 14. The cylinder 12, illustrated in detail in Fig. 9 of the drawings, is substantially similar to the cylinder of the machine disclosed in the above mentioned application and comprises a cylindrical shell 28 supported by cap members 29 and 31 slidably journaled on the shaft 14 and secured together by tie rods 33 and 34. The cap member 31 is recessed as indicated at 36, Fig. 9, to provide an annular projecting portion 37 which assists in retaining the sheet 38 (Figs. 1 and 3), which may be a sheet having a message for transmission or a recording blank, in position on the cylinder. A spring garter 39 additionally serves to retain the sheet 38 in position on the drum. The cylinder 12 is constrained to rotate with the shaft 14 by means of a pin 40, Fig. 9, which engages the tie rod 34 while permitting the cylinder to be turned freely on the shaft 14 through an angle of approximately 360°. The tie rod 33, it will be noted, is spaced somewhat further from the axis of the cylinder so as not to be engageable by the pin 40.

Longitudinal scanning movement is imparted to the cylinder 12 from lead screw 22 by a half nut member 41 carried adjacent the end of a member 42 as shown in Figs. 3 and 10. This member 42 is journaled on a hub 43 projecting axially from the cap member 31 of the copyholder 12. During rotation of the cylinder 12, the half nut 41 is pressed into meshing engagement with the lead screw 22 by means of friction discs 45 and 46 unless it is restrained by a bail member 47 and its associated mechanism later to be described. The discs 45 and 46 are pressed against each side of the member 42, and the disc 45 is pressed into engagement with the cap member 31 by a garter spring 48 encircling the conical end 49 of a collar 51, which is secured to the hub 43 by a set screw 52.

The bail member 47 has in-turned arms 53 pivotally mounted upon the bracket 24 and a bracket 54 (Fig. 1). The half nut member 41 is kept from engaging the lead screw 22 when the machine 9 is idle by a notch 55 in the member 42 which receives the bail member 47. The latter is pressed upwardly by the armature 56 of an electromagnet 57, the free end of which is biased upwardly by the spring 58. At the end of a scanning operation, the motor 18 is stopped and the bail member is pressed against the horizontally extending edge 59 of the bail member 42. The cylinder 12 may then be rotated manually in a clockwise direction as viewed in Fig. 10 to rock the member 42 until the bail member 47 is pressed into the notch 55 by the spring 58, thus to prevent re-engagement of the half nut 41 with the lead screw 22. The parts in this position, which is maintained until the magnet 57 is again energized, are shown in Fig. 10 of the drawings. During scanning, the bail 47 is withdrawn from the notch 55 and the half nut 41 is rotated into meshing engagement with lead screw 22, this condition of meshing engagement being maintained by the friction discs 45 and 46 described above. The bail member 47 is provided with a series of teeth 60 (Figs. 1 and 3) to prevent the cylinder being returned to the right except upon complete disengagement of the half nut. The teeth 60 make it necessary to rotate the cylinder 12 until the bail 47 enters the notch 55, the upper edge of which clears the top of the bail member, before the cylinder can be moved longitudinally to the right. Operative circuits for controlling the motor 18 and the magnet 57 will be described hereinafter in connection with the description of Figs. 11 to 15 of the drawings.

Longitudinal movement of the cylinder 12 from its starting position at the right of Fig. 1 is prevented by a flat spring 62 having an up-turned end 63 which, because of its flexibility, permits the cylinder 12 to be moved to the right with the half nut disengaged but prevents its movement to the left until the member 42 is rotated counterclockwise into lead screw meshing engagement (Fig. 10) to clear its end. The spring 62 is conveniently mounted upon an upwardly projecting portion 64 of the base 10.

A double throw switch 65 (Fig. 2), which is of the type biased to a normal position, is supported upon the bracket 17 so that its operating member 67 is aligned for engagement with the end of a switch operating rod 68 slidably mounted in brackets 69 and 71. A spring 73, encircling the rod, bears against the bracket 69 and an adjustable collar 76, thereby biasing the rod for movement towards the left. A handle 77 formed at the end of the rod opposite the switch 65 is conveniently accessible to an operator. A detent spring 79 (Fig. 2) extending from the bracket 69 retains the rod 68 out of engagement with the switch operator 67 against the biasing urge of the spring 73. This spring 79 is formed for engagement with a collar 81 adjustably secured to the rod by a set screw 82. The spring 79 is bent downwardly at its free end so that, when the collar 81 has been manually moved toward the right as viewed in Fig. 2 past the hump 83 on the spring, the strength of the spring 73 is insufficient to return the rod to the left to turn the switch 65 to its off position. The rod 68 is moved to the left into engagement with the switch operator 67, when the half nut carrying member 42 is approaching the end of its travel, by engagement of the member 42 with the top portion 85 of the stop member 86 adjustably secured to the rod 68 by a set screw 87. This stops operation of the machine 9 at the end of a complete scanning movement of the cylinder 12.

Pictures, messages or other subject matter may be recorded on the sheet 38 which, in this instance, will be a suitable electro-sensitive sheet, by a stylus 91, Fig. 1, mounted at the end of a stylus carrying arm 92 which projects from a member 93. This member is secured for angular adjustment by a clamp screw 94 upon a rock shaft 96 which is journaled in a bracket 97 and the bracket 71. When a record is to be made on the sheet 38, a stylus operating magnet, indicated by the reference character 99, is energized in a manner to be explained in connection with the description of Figs. 11 to 14 of the drawings. The armature 101 of this magnet is pivoted at 102 and its free end is connected by a link 103 to a rock member 104 adjustably secured on the shaft 96 by means of a clamp screw 105. When the magnet 99 is energized, the shaft 96 is rocked to bring the stylus 91 into contact with the record sheet. The switch operating handle 77 has an in-turned end 106 which projects through the bracket 71 to prevent unwanted turning of the rod 68. An arm 107 secured to the rod 68 and its in-turned end 106 rolls the spring garter 39 along the cylinder as it advances to keep the spring garter clear of the scanning devices. The arrangement is preferably such that when the handle 77 is operated, the garter will be automatically pushed back out of the way of the optical system or stylus. An upstanding instrument panel 128 (Fig. 2) in the approximate form of a shallow pan is mounted adjacent the rear edge of the base 10 by a screw threaded means engaged in holes 131 appearing in Fig. 1. A filter or an air purifying member 132, of an appropriate type, closes the open side of the instrument panel, and fumes and gases which may be evolved during recording in the neighborhood of the stylus 91 are forced through a conduit member 133 by a fan 134 on the rotor shaft of the motor 18 to the chamber formed within the instrument panel 128. Deleterious matter is removed from the air and retained in the filter 132. The side of the instrument panel which faces inwardly toward the mechanism carried by the base 10 affords a convenient mounting surface for the apparatus comprising the amplifiers and other electrical equipment of the machine.

With the exception of clutch 19, the parts of the machine 9 thus far described are substantially like the combined transmitter and recorder disclosed in the copending application Serial No. 293,188 referred to above. The photocell and exciting lamp arrangement to be described constitute one of the improvements to be claimed hereinafter.

When the machine 9 is used as a recorder, the clutch 19 serves to couple the cylinder 12 with the worm wheel 21 under control of an electric circuit including a commutator 139 and contact brush 141. Referring to Fig. 4, the clutch 19 includes a member 143 rotatably mounted on the shaft 14 and positioned between a set screw fastened collar 144 and a split collar 146 which is clamped for angular adjustment on the shaft by a clamping screw 147. The split collar 146 is provided with a radially extending arm 148 having an in-turned end 149 forming the principal driven member of the clutch. The driving parts of the clutch comprise a block 151 having a recess 152 which fits the reduced portion 154 of the member 143. A friction member 157 of felt, vulcanized fiber, or other suitable friction material is also recessed to fit over the reduced portion 154, and the parts 151 and 157 are held in frictional contact with the portion 154 by a spring 159 attached at each end to pins 161 (Fig. 1) projecting from each side of the block 151. A ratchet disc 163 provided with crown teeth 164 fits securely in driving engagement on a second reduced portion 166 of the member 143. A relatively light swingable driver 167 having a projection 168 for engagement with the crown teeth 164 is pivoted at 169 on the block 151 and is urged toward the crown teeth 164 by a relatively light spring 170. The cylinder 12 is marked in some suitable manner as by a line 171 inscribed thereon, and this line, the contact 172 on the commutator 139 and the driven member 148 all possess a predetermined angular relationship to facilitate the framing or phasing operation in a manner to be described in connection with Figs. 11 to 14 of the drawings. In one mode of operation the member 148 preferably is set on the shaft so that it is in the same plane as the line 171 on the cylinder when the cylinder is being driven. The position of the commutator is preferably determined after tests with the distant station. When the distant station is transmitting, the amount of displacement of the message on the blank may be determined and the commutator rotated that amount if the direction of rotation is to the right and opposite to rotation if the displacement is to the left. The set screw provides for locking the commutator on the shaft. The frictionally urged driver 167 is withdrawn from and maintained out of engagement with the crown teeth 164 by a cam member 174 (Fig. 2) having an inclined edge 176 which cams the driver 167 outwardly as it rotates toward the member 174 when the latter is interposed in its path of rotative movement. A notch 177 (Fig. 1) in the driver 167 comes into engagement with the cam edge 176 and follows it downwardly until it is positively stopped by the horizontal edge 178 (Fig. 2) on the cam member 174. With this arrangement, only the relatively light member 167 is stopped, and the heavier rotating parts come to rest later because of bearing friction. The spring 159 applies a compressive force which produces only enough frictional bias on the arm 167 to seat it against the edge 178. The cam member 174 is secured at the end of an arm 181 carried by the armature 182 of phasing or framing magnet 183. The armature 182 is pivotally carried by adjustable trunnions 184 which lie above the magnet coils 186, whereby when these coils are energized, the cam member 174 is moved to the left, as viewed in Fig. 5. An adjusting screw 187 serves to adjustably limit movement of the armature 182. A spring 188 connected to a stationary portion of the machine and the arm 181 biases the arm to the right, as viewed in Fig. 5. When the arm 181 is drawn to the right, the cylinder 12 is stationary, since the driver 167 is withdrawn from engagement with the teeth 164 and the driven member 148. Upon energization of the electromagnet 183, the driver 167 suddenly engages one of the crown teeth 164, whereupon the member 143 and the driver 167 rotate together, and the driver encounters the extension 149 of the driven member 148, following which the clutch parts rotate solidly as a unit to drive the cylinder 12. The end of the driving member 148 is reduced in cross section as shown in Fig. 5 to impart a slight resiliency to cushion the impact of the member 167.

The armature 182 of the framing magnet is provided with a contact operating arm 192 (Figs. 1, 2 and 12) which closes a pair of framing magnet locking contacts 193 and 194 and a second pair of contacts 196 and 197 upon energization of the framing magnet. The pairs of contacts just described are employed to provide safety features, and their use will be described in connection with Fig. 12 of the drawings.

When the machine 9 is to be operated as a transmitter, the sheet 38 will display the picture or message to be transmitted which will be scanned by the photoelectric pick-up device comprising the exciter lamp 199, the lens tubes 201 and 203, the photocell 204 and the light chopper 205. The lens tube 201 is mounted on a base 206 which is removably and adjustably fastened by open ended slots 207 and screws 208 to a pedestal 209. The lamp 199 is adjustably mounted on a post 210 carried by the base 10, adjustment being accomplished by a clamping screw 211 which allows for rotation of slotted bracket 212 about the post 210, and a set screw and lock nut combination 213 and 214 which permits the lamp to be rotated about its own axis. The slot in the bracket 212 provides for longitudinal adjustment of the bracket. An apertured shield 216 allows light flux from the lamp 199 to pass through the tube 201 where it is focused upon the surface of the sheet 38. The lens tube 203 ends in a wall 217, upon which is projected an image of the illuminated area of the sheet 38. Light from a small portion of this image passes through the aperture 218 in the end wall 217 and through the spaced slots in the light chopper 205 to the photocell 204. The light chopper disc 205 is supported on the rotor shaft 219 of the light chopper motor 221 and serves in a well known manner to cause the photocell 204 to generate a carrier frequency. It will be understood, however, that the carrier frequency may be generated separately in any suitable or desired manner and may be modulated by the varying current produced in the photocell 204 as subject matter on the sheet 38 is scanned. To provide signals at the recorder which will give a positive copy without the necessity of inverting the signals, an additional photocell 222 is provided which receives a portion of the light flux emitted from the lamp 199 by way of the translucent screen 223 (Fig. 8), a mirror 224 and an aperture 226. It will be understood that a separate light source such as an additional lamp may be used to replace the mirror 224. The mirror and screen are fitted to a housing 228 which is carried on the base member 206. The base 206, the tube 203 and the housing 228 are removable as a unit. The aperture 226 is formed in an arm 229 pivoted at 230 to the base member 206. The arm 229 is bifurcated at its end and fits over the pivot 230 from which it may be readily removed. The arm 229 provides for adjusting the position of the aperture 226 with respect to the aperture 218 and the chopper disc 205 so that light from the exciter lamp 199 will be cut off from one photocell when it is impinging on the other. A clamping nut 231 clamps a stationary fin 232 between the arm 229 and a member 233 to maintain the arm 229 in the desired position of adjustment. When the nut is loosened, the arm may be removed, as stated above. The picture modulated carrier current by reason of this combination of photocells represents an inverted or negative image of the subject matter on the sheet 38 in the manner fully described and explained in the patent to R. J. Wise No. 2,176,442, granted October 17, 1939. The auxiliary photocell 222 has its anode connected to a potentiometer 234 (Figs. 1 and 11) so that its effect may be balanced against that of photocell 204 to obtain a balance on black or intermediate tones of the picture, if desired. A conveniently accessible knob 235 (Fig. 1) provides for adjusting the potentiometer 234.

Figure 11:
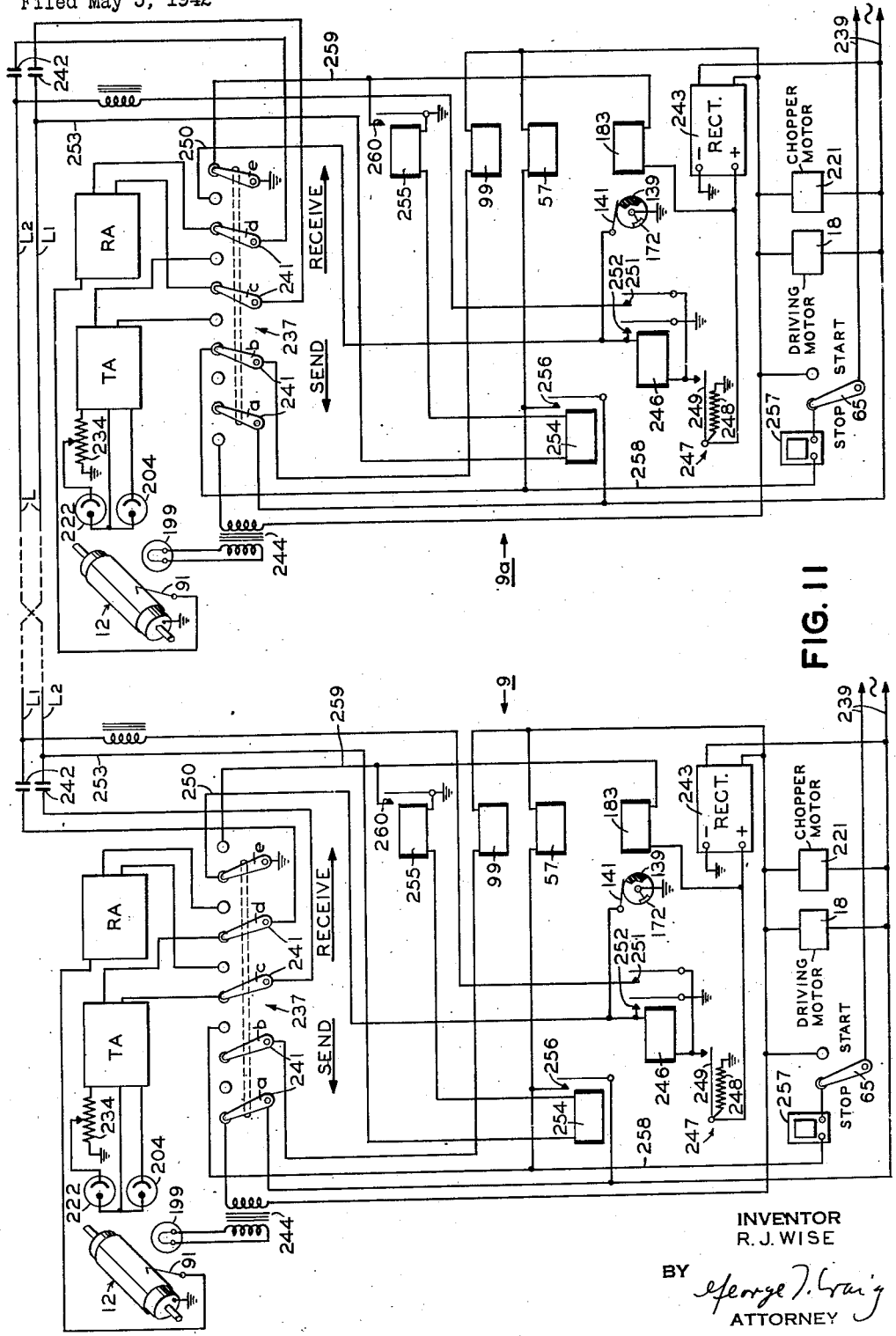
Fig. 11 is a diagrammatic showing of the electrical features of a control system in accordance with the invention.

A signaling rectifier 243, for supplying direct current energy for operating the control equipment disclosed by Fig. 11 of the drawings, is conveniently located in the machine 9 by mounting its parts on a base plate 195. An extension 215 of the side wall of the housing for the rectifier is secured by screws 225 to the base 10. A conical thumb nut 238, threaded on a stud projecting from a stationary post, cooperates with a slot in a bracket 240 to complete the securing means and locate the base plate 195 in the position allotted to it when the nut is tightened.

The operation of the mechanical parts of the machine 9 to send and receive messages in facsimile will now be described without considering details of the control circuits involved in the operations at this time. A person wishing to transmit a picture or message in facsimile writes or otherwise impresses the message on the surface of the sheet 38. Where the machine 9 is to be used for commercial service, the message sheet 38 is generally provided with printed heading indicated by reference character 236 and the subject of the message is generally written beneath this printed matter. To insure that the message will be recorded at the receiver in its proper position on the recording sheet or blank, the sheet displaying the matter to be transmitted is wrapped around the cylinder 12 in such a way that one edge thereof lies along the line or mark 171 which is in proper angular position with respect to the lens tube 203 when the pin 40 engages the rod 34 in the cylinder 12 and the driving and driven parts 167 and 149 of the clutch are in operative driving engagement.

At or before this time the machine is started by drawing the rod 68 to the right as viewed on Fig. 1 by means of the handle 77 thereby starting the motors 18 and 221 and energizing the photocell exciting lamp 199 and the transmitting amplifier TA associated with or built into the machine. A multiple contact send-receive switch 237 (Fig. 11) is turned to its send position. Upon receipt of an appropriate signal from the receiver connected to the machine 9, the electromagnet 57 will be energized to draw the bail 47 from the notch 55 (Fig. 10) allowing the half nut 41 to engage the lead screw 22 against which it is pressed by the action of the friction discs 45 and 46 in the manner explained above. When the surface of the transmitting sheet 38 has been scanned by axial movement of the cylinder 12, the lower end of the member 42 which travels along with the cylinder engages the member 86, forcing the rod 68 to the left to operate the switch 65 thereby stopping the machine.

The cylinder remains in its extreme left hand position after power has been cut off from the machine by the switch 65. The cylinder may be restored to its initial position at the right by rotating it manually in a clockwise direction as viewed from the right of Fig. 1 to disengage the half nut 41 from the lead screw 22. As previously explained, the teeth 60 on the bail 47 compel the operator to completely disengage the half nut from the lead screw before the cylinder can be returned. This prevents damage of the lead screw or half nut by sliding the half nut along the lead screw. When the cylinder 12 is returned as far as it will go to the right, the position of the ball 47 in the notch 55 prevents manual engagement of the half nut with the lead screw and the end 63 of spring 62 prevents inadvertent movement of the cylinder 12 toward the left.

The mode of operation of the machine 9 when used as a recorder is similar to that already described except that the send-receive switch is placed in the receive position following the receipt of the call which conditions the control circuits of the machine in a manner to be described so that the magnet 99 will be energized with the magnet 57 to move the stylus 91 into engagement with a record sheet retained in position on the cylinder 12 by the garter spring 39.

Referring to Fig. 11 of the drawings diagrammatically showing electrical features of the machine 9 adapting it for interconnection with a similar machine such as the machine indicated for convenience of description by the reference character 9a, the apparatus parts shown diagrammatically are given the same reference characters previously assigned in connection with the description of Figs. 1 to 10. In the description which follows, it will be assumed that the machine 9a is to function as a recorder. The magnets 99 and 57 are the stylus and half nut magnets respectively, and the motors 18 and 221 are the driving motor and light chopper motor respectively. These magnets and motors are wired to be connected at both machines to a suitable or frequency regulated alternating current source 239, through the switch 65. The send-receive switch 237 is diagramatically shown as comprising five simultaneously operated switch arms 241 which may be mounted upon a manually rotatable shaft. The well known "Yaxley" type of switch is suitable for the purpose.

L1 and L2 indicate the lines of a communication circuit L which extends between the pair of similar machines 9 and 9a, the lines L1 and L2 being transposed between the machines so that control signals initiated at one machine will be received over a different control circuit of the interconnected machine. The communication circuit is terminated at the arms c and d of the switch 237 so that the sending amplifier TA or the receiving amplifier RA will be connected for sending or receiving respectively depending on the position of the switch 237. A pair of blocking condensers 242 are provided to isolate the alternating current facsimile signals from the direct current control signals.

Assuming that a message is to be transmitted from the machine 9, shown diagrammatically at the left of Fig. 11, to the machine 9a shown diagrammatically at the right, over the conductors L1 and L2, the switch 65 assumes its "start" position upon drawing the operating rod 68 (Figs. 1, 2 and 3) to the right. This will energize the driving motor 18, the chopper motor 221 and the rectifier 243 which supplies DC power for the control circuits. It will be understood that a battery or any other suitable source may replace the rectifier 243. Similarly, power, suitably rectified where necessary, is applied to the amplifiers TA and RA in any conventional manner (not shown). The sending amplifier TA is connected to lines L1 and L2 by switch arms c and d and the primary of the exciter lamp transformer 244 is connected to the source 239 by the switch arm a with the switch 237 in the send position. A signaling relay 246 is energized from the rectifier 243 after a thermal current time delay switch 247 has been connected to the rectifier for a sufficient time for its heater element 248 to cause its thermostatic tongue 249 to complete the circuit including the coil of the relay 246, a conductor 250, and switch arm e of switch 237 in the send position, to ground. When the machine 9 is operated as a transmitter, the delay afforded by the time delay switch 247 is incidental. The make contact 251 of the relay 246 connects the line conductor L1 to the positive pole of the source 243. This relay is also locked through its make contact 252 to ground.

The machine 9a at the right hand side of Fig. 11 has the same internal connections as the machine 9, and by reason of the transposition of the conductors L1 and L2 between 9 and 9a, receives the signal applied to L1 by the relay 246 at 9 over a conductor 253 which is connected to the operating coils of relays 254 and 255 in series and energizes these relays. These relays and the circuit just traced find their counterpart in the machine 9. The make contact 256 of the relay 254 of machine 9a connects a buzzer 257 or other signaling device from one side of the A. C. source 239, which is synchronous with the power supply source 239 of the machine 9, over a conductor 258 to the left hand contact of the switch 65 which is in its "stop" position. To answer this call, the attendant at the machine 9a places a recording sheet on the cylinder 12 with one edge thereof on the line 171 and moves the rod 68 to operate the switch 65 to its "start" position, thereby silencing the buzzer, starting the motors 18 and 221 and energizing the rectifier 243. The send-receive switch 237 is then manually moved to the receive position in which it is shown in Fig. 11. The switch arm a of this switch disconnects the photocell exciting lamp 199, which is not needed inasmuch as the machine 9a is to operate as a recorder. The stylus magnet 99 is energized from the source 239 by way of the switch 65, the switch arm b and the contact 256 of the relay 254. The switch arms c and d connect the receiving amplifier RA to the lines L1 and L2 in place of the sending amplifier TA. The switch arm e applies ground to the conductor 259 to energize the clutch magnet 183 from the rectifier 243, thereby starting the cylinder 12 of the machine 9a. The contact 260 of the relay 255, which was energized at the machine 9a simultaneously with the relay 254, also applies ground to the clutch magnet 183 but this is incidental at the receiver. The time delay switch 247 will prevent energization of the relay 246 and sending of a framing signal to the machine 9 over the line L2 until the driving motor 18 has come up to speed. After the time delay switch 247 closes, the circuit of the coil of relay 246 will still remain open until the segment 172 of the commutator 139 engages the brush 141. When this circuit is completed at the brush 141, the contact 251 of the relay 246 will connect the positive pole of the rectifier 243 to the line L2. Also, the relay 246 will be locked to ground by its contact 252.

Upon receipt of the direct current framing signal from the receiver 9a over line L2 at the machine 9, relays 254 and 255 will be operated. The half nut magnet 57 will be energized from the make contact 256 of the relay 254 and the switch 65. The clutch magnet 183 will be energized at the make contact 260 of the relay 255 to start the cylinder 12 of the transmitter 9 in proper phase relationship with the cylinder of the receiver 9a to insure accurate register of the received copy with respect to the marginal portions of the record sheet 38.

Scanning at both machines proceeds until the entire length of the cylinder has been covered, whereupon they will be stopped by engagement of the end of the rod 68 with a switch operator 67 on each respective machine. If the person operating the transmitter so desires, he may stop the transmitter when he observes that the entire message has been transmitted. The recorder, however, will continue to operate until its cylinder 12 reaches the position which causes operation of the switch 65 to the "stop" position.

The receiving operator may recover the received copy from the machine by manually rotating the cylinder 12 to free the half nut 41 from the lead screw 22, whereupon the cylinder may be drawn to the right to its accessible position.

Transmission from the machine 9a to the machine 9 as a recorder may be obtained in a manner exactly similar to that just described, the determining factor being the position of the send-receive switch 237 which arranges the control and amplifier circuits for sending or receiving, as the case may be. Operation of the arrangement just described for sending in the reverse direction from 9a to 9 will be obvious from the foregoing.

Fig. 12 of the drawings discloses a control system similar to the system illustrated by Fig. 11 but having additional features to afford a more fool-proof operation of a pair of interconnected machines embodying the mechanism described in connection with Figs. 1 to 10 of the drawings. The machine 9a is identical with the machine 9 and therefore a showing of its wiring diagram is omitted. The parts which are identical with those illustrated in Fig. 11 are designated in Fig. 12 by the same reference characters but having the suffix $b$ added to facilitate ready reference to the portion of the specification immediately following.

The principal pieces of added equipment are a relay 263 which prevents operation of the machine 9 with a send-receive switch 237b in an incorrect position for the operation desired, and a signal lamp 264 which indicates displacement of the switch 237b from its desired position by illuminating a transparent or translucent member (not shown) located in a conspicuous position on the machine. The operating coil of the relay 263 is connected to the alternating current source 239b through a break contact 265 of the relay 254b. The relay 263 after energization by way of the make contact 265 of the relay 254b is locked at its make contact 266. The relay 263 is energized when the machine 9 is to be used as a transmitter and the send-receive switch 237b is correctly placed in its send position. When the machine 9 is to operate as a receiver with the send-receive switch 237b in its proper position for recording, the relay 263 is not operated, since the relay 254b is energized from the distant transmitter over the line conductor L2 to ring the bell 257b when a message is to be transmitted. When the distant transmitter is turned off, either manually or automatically, the relay 263 is energized at the receiver and the lamp 264 is lighted to show that the receiver may be stopped, unless it has already stopped automatically.

A make contact 267 and a break contact 268 transfer a connection from the D. C. source 243b by way of the added switch arm $f$ of the send-receive switch from the lamp 264 to the relay 246b when the send-receive switch is in the send position for transmission of messages. A make contact 269 and a break contact 271 transfer the connection from the D. C. source over the switch arm $f$ from the lamp 264 to the relay 246b when the send-receive switch is in its receive position for recording and the relay 263 is de-energized. The pairs of contacts 193—194 and 196—197 (Fig. 1), operated by the switch operating member 192 on the armature 182 of the clutch magnet 183b (Fig. 2), are employed in the arrangement disclosed in Fig. 12 of the drawings to lock the clutch magnet in its energized condition, and to insure that the half nut magnet and the stylus magnet will remain deenergized until the clutch magnet is energized, respectively. The contacts 196 and 197 are interposed in the connection from the make contact 256b of the relay 254b to the half nut magnet 57b and, also, to the stylus magnet 99b when the switch arm $b$ of the send-receive switch 273b is in the receive position. This insures that the stylus magnet and the half nut magnet will not be energized until the clutch magnet 183b is energized. The locking connection with the clutch magnet 183b including the pair of contacts 193 and 194 insures that the clutch magnet will remain energized as long as the machine is in operation.

The relay 263 functions to prevent transmission with the switch 237b in the receive position in the following manner. The relay 263 is energized from the start-stop switch 65b when the latter is moved to "start" position, but only if the tongue of the relay 254b is against its break contact 265, as shown in Fig. 12. With the start-stop switch 65b in "start" position and the switch 237b properly in its send position, the indicator lamp 264 is not illuminated, since its circuit is interrupted at the break contact 269. Also, when the switch 237b is correctly in its transmit position, the circuit for the relay 246b is closed at the make contact 267. If the transmit-receive switch is incorrectly placed in the receive position when sending is desired, the lamp 264 is illuminated by way of the make contact 269 of the relay 263. Also, when the switch 237b is incorrectly in its receive position, the circuit for the relay 246b is open at the break contact 271.

If the transmit-receive switch 237b is incorrectly in the send position when a message is to be received in response to a call from an interconnected machine, operation of the relay 246b is prevented, since the energizing circuit of this relay will be open at the receiver contact of switch arm $f$. The lamp 264 is lighted at this time by way of the switch arm $f$.

Thus, a person inadvertently trying to send or receive with the transmit-receive switch 234b in the incorrect position is prevented from doing so and the lamp 264 gives an indication of the error. The arrangement just described prevents a person from attempting to operate the machine as a transmitter if the machine at the other terminal of the line is calling, as an incoming call will energize the relay 254b and keep the operating circuit of the relay 263 open at the break contact 265.

When transmission of a message is completed and the transmitter is stopped by moving the switch 65b to its "stop" position either manually or automatically when the cylinder 12 completes its travel, direct current energization is removed from the relay 254b at the receiver 9a. This operates the relay 263 which disconnects the direct current signaling source 243b from line L1 at the make contact 251b of the relay 246b and connects it through the signal lamp 264, indicating that transmission of the message is completed, as stated above, and that the receiving machine may be stopped and the message removed. The removal of battery from line L1 at the receiver deenergizes the relay 254b at the transmitter, thus preventing a false call-back.

The equipment of Fig. 12 of the drawings is operated in the same way as the equipment already described in connection with Fig. 11 and, therefore, a detailed description of each operating step will not be repeated. A time delay feature provided by a high resistance 272 and a condenser 273 is introduced in the framing commutator circuit to prevent energization of the relay 246b immediately if the contact brush 141b is resting on the contact segment 172b when the machine is stopped following a previous operation.

Fig. 13 discloses a modification of the system of the invention for interconnecting a pair of facsimile machines 9 and 9a in which the communication circuit L comprises a pair of conductors L1 and L2 which are used together in parallel for the transmission of D. C. control signals in the manner of the well known simplex circuit. The conductors L1 and L2 are bridged at each machine, constituting a sending or receiving station, by an inductance 275. This inductance will, usually, be made a part of the apparatus housed in each machine. The facsimile signals are generated and recorded in the manner explained in connection with Figs. 1 to 12 of the drawings, the send-receive switch 277 connecting the sending amplifier TA or the receiving amplifier RA to the line conductors L1 and L2 in accordance with the position in which it is placed.

To operate the machine 9 as a transmitter to send to a similar machine 9a, a message sheet bearing subject matter to be transmitted is applied to the cylinder 12 and held in place by the garter spring 39. Power is supplied to the machine 9, which is to function as a transmitting apparatus, by closing a switch 278, thereby connecting a suitable source of alternating current potential 279 to a rectifier 281 which supplies direct current for signaling. The switch 65 shown on Figs. 1 and 2 may be employed to function as the switch 278. The driving motor 18 for the cylinder 12 and the light chopper motor 221 are also energized upon closing the switch 278. Also, the exciter photocell lamp 199 is illuminated. Power, suitably rectified where necessary, is applied to the heaters of the tubes of the amplifiers TA and RA at all times so that they will be in readiness for immediate operation. The plate supply for the amplifiers is controlled by the make contact 282 of a relay 283, the operating coil of which is energized directly from the direct current signaling source 281 upon closing the switch 278. However, only the transmitting amplifier at the machine 9 is used at this time. A calling signal is applied to the line conductors L1 and L2 in parallel by way of the inductance 275 over a circuit which may be traced from the source 281, the make contact 286 of a relay 287, and the operating coils in series of a relay 289 and a calling relay 291. The relay 287 is energized from the signaling source 281 over the switch arm e of the send-receive switch 277 in its send position to ground. Ground applied by the segment 172 of the commutator merely supplements the ground applied at the transmitter by the switch arm e. The make contact 293 of the relay 287 prepares a locking circuit for the relay 287 by way of the make contact 295 of the relay 289, which is not pulled up at this time, as it is adjusted to operate on a relatively high value of current.

At the receiver 9a the signal applied to the conductors L1 and L2 traverses the coils of the relays 289 and 291 to ground at the break contact 297 of the relay 287. A buzzer 298 is energized at the make contact 299 of the relay 291 and sounds to attract the attention of the attendant at the machine 9a. The attendant answers the call by closing the switch 278 thereby energizing the source of direct current signaling potential 281 at the machine 9a. The send-receive switch 277 at the machine 9a is placed in the receive position. The relay 283 is energized, short-circuiting the coil of the relay 291 by a circuit including the switch arm g and the make contact 300 of the relay 283, silencing the buzzer. The cylinder 12 and commutator 139 of the machine 9a will start, as its clutch magnet 183 will be energized via the switch arm f. The relay 287 is energized from the commutator segment 172 over the conductor 301 and thereby applies a signaling potential at its make contact 286 from the source 281 to the simplex circuit in series with the signaling potential at the machine 9, causing a current of higher value to flow in the simplex circuit. The increased value of current causes the relay 289 at the machine 9a to operate and to be locked at the make contact 293 of the relay 287. The locking circuit includes the normally closed cylinder operated contacts 302 which are in parallel with the tongue and make contact 293 of the high current relay 289. A make contact 303 of the relay 289 at the receiver energizes the half nut magnet 57 and the stylus magnet 99. Switch arm b is included in the operating circuit of the stylus magnet.

The relay contact 303 at the machine 9, operating as a transmitter, energizes the clutch magnet 183 of the machine 9 in phase with the commutator at the machine 9a and also energizes the half nut magnet 57, thereby starting the cylinder at the machine 9 in proper phase relationship with the cylinder 12 at the machine 9a. The stylus magnet 99 is cut out by switch arm b at the machine 9.

When cylinder 12 of the machine 9, acting as a transmitter, reaches the end of its travel, the switch 278, which, as stated, may be the switch 65 in Fig. 1 of the drawings, cuts off all power at the transmitter including the direct current power supply 281, thereby dropping the signaling current in the simplex circuit to a value which causes the relay 289 to be released. This lower, or calling value of the current, is not effective to cause the buzzer to sound at the machine 9a because the contacts 302 are arranged to be opened after a short travel of the cylinder 12, resulting in deenergization of the relay 287 at the machine 9a.

Operation of the arrangement of Fig. 13 just described for sending in the reverse direction from the machine 9a to the machine 9 will, it is believed, be obvious from the foregoing.

Fig. 14 of the drawings discloses a system similar to that of Fig. 11, but in which a send-receive relay 305, corresponding to the send-receive switch 237 of Fig. 11, is automatically operated when the control system of the machine with which it is associated is energized from the alternating current source 306 upon operation of the switch 65 to its "start" position. The relay 305 may be of any desired type having the necessary number of contacts and cooperating contact tongues or springs. As shown, it is biased to the send position by a spring 307. The mechanical parts of the machine 9 are given the same reference characters as in Figs. 1 to 10 of the drawings.

As in Figs. 11 and 12 of the drawings, the communication circuit L comprises a pair of line conductors L1 and L2 which are transposed between the interconnected machines 9 and 9a so as to direct signals originating at the machine operating as a transmitter to the receiver signaling circuits of the machine operating as a receiver, and to direct signals originating at the receiver into the proper circuits of the transmitter. The arrangement of the amplifiers of the facsimile signal generating and recording equipment is substantially the same as that disclosed by Figs. 11 and 12 of the drawings, the blocking condensers 308 isolating the alternating current facsimile signals from the direct current control signals. The polarity of the direct current potentials which are applied to the conductor L1 is controlled by the send-receive relay 305 at the transmitter. Likewise, the polarity of the direct current control signals applied to the line conductor L2 at the receiver is controlled by its send-receive relay 305. A polar relay 309 directs these signals into the proper channels during the automatic functioning of the control equipment to set up signaling circuits in a predetermined sequence which results in starting the transmitter in proper phase relationship with the cylinder 12 of the receiver. The relay 309 is of the three-position type whereby the armature thereof is moved to one extreme contact in response to one polarity of potential, to the other extreme contact in response to the opposite polarity of potential, and to a mid position disengaged from both of the extreme contacts in response to a no-current condition.

Assuming that a message is to be sent from the machine 9 operating as a transmitter to the machine 9a operating as a receiver, the switch 65 will be turned to its "Start" position. This energizes the exciting lamp 199 and the source of direct current signaling potential 311, and starts the cylinder drive motor 18 and the light chopper motor 221. The biasing spring 307 of the send-receive relay will maintain its movable contact arms in the send position. Current from the source 311 traversing the heating element 314 of a thermal current time delay switch 316 will cause its thermostatic element 317 to energize a relay 318 from the signaling source 311 by way of a contact brush 319 and a contact segment 320 on a commutator 321. The commutator 321 in this modification of the invention in associated with the driven member of the cylinder driving clutch in a manner to insure that the brush 319 will be in contact with the segment 320 when the clutch stop arm 322 is stopped by the armature 323 of a clutch magnet 324. A structure which is the equivalent of that just described may be obtained by mounting the commutator segment 172 of Figs. 1 to 5 on a commutator driven directly from the block member 151. The relay 318 is locked immediately upon energization by way of its make contact 326. The action of the commutator at the sending station is incidental. The make contact 327 of the relay 318 connects the positive pole of the source 311 to L1. This connection may be traced from the conductor 328, the contact arm f of the send-receive relay 305 and the make contact 327 of the relay 318.

The next step in the sequence of operations occurs at the machine 9a, operating as a receiver, where the positive signal on line L1 swings the armature of the polar relay to the left into engagement with its contact M, energizing the operating coil 329 of the relay 305 from the secondary of a transformer 330, thereby shifting the contact arms of the send-receive switch to the receive position. The buzzer 331, or other audible or visual signal, is connected to the source 306 by way of the contact arm a, thereby summoning the attendant at the machine 9a and advising him that the attendant at machine 9 desires to establish facsimile communication. The attendant at the receiver 9a responds by moving the switch 65 to its "start" position. This disconnects the buzzer 331, connects the motors 18 and 221 and the rectifier 311 to the source 306, which is synchronous with the source 306 at the machine 9. As with Figs. 11 to 13, synchronism may be maintained by connecting both machines to the same power network, or by providing synchronizing equipment of any known type if different power supply facilities are used. The phasing clutch magnet 324, the half nut magnet 57 and the stylus magnet 99 will be energized. The thermal current time delay switch 316, after a time delay insuring that the cylinder and commutator of the receiver are up to speed, will connect the operating coil of the relay 318 in circuit with the commutator and brush so that the relay 318 will be energized at the instant contact is made at the commutator segment. Negative signaling potential will be applied to the line L2 by way of the switch arm f and the conductor 332.

This signal of negative polarity is received by the polar relay 309 of the machine 9 acting as a transmitter and moves its armature to the right into engagement with the contact S, thereby energizing the framing magnet 324 to start the cylinder 12 in the desired phase relationship with the cylinder 12 of the machine 9a. The half nut magnet 57 is also energized at this time. This starts transmission of the subject matter affixed to the cylinder 12 of machine 9 to the recording stylus 91 of the machine 9a, which records it on a record sheet affixed to its cylinder 12. The two machines operate together in this manner until their start-stop switches 65 are moved to the "stop" position upon completion of the travel of the cylinders to the left. If, however, the transmitter is stopped either automatically or manually before the recorder stops, the recorder turns into a transmitter, since the armature of its polar relay 309 assumes the central or no-current position.

A relay 334 connected to the line side of the polar relay 309 controls a signal lamp 336 which lights, showing that transmission is finished and that the recorder should be stopped to silence the buzzer which sounds at the transmitter, since the relay 305 at the transmitter is energized, until the receiver start-stop switch is moved to the "stop" position. This light will be extinguished when the switch 65 is moved to the "stop" position. When the machine 9 is operating as a transmitter, the lamp 336 will be illuminated until the negative phasing signal is received over L2, whereupon the lamp will be extinguished, showing that the transmitter has started properly in response to a signal from the receiver.

Operation of the arrangement of Fig. 14, just described, for sending in a reverse direction from the machine 9a to the machine 9 will be obvious from the foregoing.

From the foregoing description of several illustrative embodiments of the invention it will be seen that a facsimile telegraph system for providing communication between a pair of facsimile machines operated by relatively inexperienced persons is provided by the present invention. The invention also provides a facsimile machine which, because of the inventive features thereof, can be operated interchangeably as a transmitter or a receiver in conjunction with a similar machine, or a machine embodying the control elements of the control system of this invention.

What is claimed is:

1. In a facsimile telegraph system, a plurality of facsimile machines interconnected for facsimile communication, each having a scanner comprising a rotary member having an area to be scanned and a device to traverse said area by closely spaced excursions representing scanning lines, power-driven means for causing relative movement between said member and said device at said machines, a connection operative to produce said relative movement comprising a power transmission means of the positive connection type, frictionally urged control means for controlling operation of said positive power transmission means, and means for releasing said control means at one of said machines when the rotary member at another machine is in a predetermined angular position.

2. In a facsimile telegraph system, a plurality of facsimile machines interconnected for facsimile communication, each having a scanner comprising a rotary member having an area to be scanned, a device to traverse said area by closely spaced excursions representing scanning lines, means to initiate the traverse of said area by said device, power-driven means for causing relative movement between said member and said device at said machines, a connection operative to produce said relative movement comprising a power transmission means of the positive connection type, frictionally urged control means for controlling operation of said positive power transmission means, means for releasing said control means at one of said machines when the rotary member at another machine is in a predetermined angular position, and means at the other of said machines for releasing said traversal initiating means upon timed operation of said control means.

3. In a facsimile telegraph system, a plurality of stations adapted for interconnection over a communication circuit, each station having a copyholder, facsimile signal generating means for generating facsimile signals in accordance with subject matter appearing on a message sheet supported by said copyholder and recording means for recording subject matter on a record sheet supported by said copyholder, and means at each station for connecting either said signal generating means, or said recording means to said communication circuit whereby to provide for facsimile transmission from any one of said stations and facsimile reception at the remainder of said stations.

4. In a facsimile telegraph system, a plurality of stations adapted for interconnection over a communication circuit, a copyholder, facsimile signal generating means for generating facsimile signals in accordance with subject matter appearing on a message sheet supported by said copyholder and recording means for recording subject matter on a record sheet supported by said copyholder at each station, means at each station for connecting either said signal generating means or said recording means to said communication circuit, signal responsive means at each station for producing relative scanning movement between said copyholder and said signal generating means and said recording means, and means operative at one of said stations for generating a signal in timed relationship with the relative movement between its copyholder and one of the said signal generating or recording means cooperating therewith, means whereby said signal responsive device at said other stations is responsive to said signal to initiate relative movement between said copyholder and said signal generating means or said recording means at said other stations whereby to provide facsimile transmission and reception in proper phase relationship from any one of said machines to the remainder of said machines.

5. In a facsimile telegraph system, a pair of stations adapted for interconnection over a communication circuit, a copyholder, facsimile signal generating means for generating facsimile signals in accordance with subject matter appearing on a message sheet supported by said copyholder and recording means for recording subject matter on a record sheet supported by said copyholder at each station, signal responsive means at each station for disconnecting said signal generating means from said communication circuit and connecting said recording means to said communication circuit, means at each station for producing a signal and applying it to said communication circuit when it is placed in operation, and means at each station responsive to said signal on said communication circuit for operating said signal responsive means to connect said recording means to said communication circuit whereby the one of said machines first to be placed in operation conditions said other machine as a receiver.

6. In a facsimile telegraph system, a plurality of similar transmitter-recorders adapted for interconnection over a communication circuit, each transmitter-recorder having a sending scanner and a receiving scanner, common motor driven means for said scanners, a start-stop switch for controlling said motor driven means, a calling signal, means to render said calling signal responsive to an incoming call when said start-stop switch is in the stop position, means to initiate a call when said start-stop switch is in the start position, and means to render said calling signal inoperative when said start-stop switch is in the start position whereby a call may be initiated or answered at any one of said transmitter-recorders by manipulating its start-stop switch.

7. In a telegraph system, a pair of stations adapted for interconnection over a communication circuit, simplexed connections at each of said stations providing a simplex circuit between said stations, a source of potential at each station, means to connect said source of potential in said simplex circuit at one of said stations serving as a calling station, and timing means at said other station for connecting its source of potential in series with said previously connected source of potential.

8. A facsimile transmitter-recorder comprising a "send-receive" switch having a signal sending position and a signal receiving position, mechanism in said transmitter-recorder capable of operation upon connection to a power source, a signaling circuit, a relay, and circuit connections between the contacts of said relay, said "send-receive" switch and said signaling circuit for connecting said signaling circuit in sending relation to said transmitter-recorder when said "send-receive" switch is in the send position and in receiving relation when said send-receive switch is in the receive position.

9. A telegraph system comprising a telegraph transmitting device, means to support a message sheet for cooperation with the transmitting device, means comprising a motor and a clutch to drive said message supporting means, a receiving station, means operable upon starting of said motor when said device is in transmitting condition for signaling said receiving station to apprise an attendant at said receiving station that a message is awaiting transmission, and means at said receiving station to release said clutch at said transmitter when said receiving station is in condition for reception.

10. In a facsimile telegraph system, a communication circuit, a combined facsimile transmitter-recorder at each terminus of said communication circuit, a clutch for each of said transmitter-recorders, means to control operation of said clutch, means associated with each of said transmitter-recorders and operable periodically for controlling the starting time of either one of said machines operated as a receiver, and means responsive to one of the periodic operations of said controlling means associated with said machine to be operated as a transmitter for operating said clutch controlling means to engage said clutch, whereby the record at the receiver will be properly framed with respect to subject matter on the message sheet at the transmitter.

11. In a facsimile telegraph system, a pair of combined facsimile transmitter-recorders, a communication circuit interconnecting said transmitter-recorders, said communication circuit comprising a pair of conductors, each conductor serving as a separate signaling path between said transmitter-recorders, isolating means at each transmitter-recorder permitting passage of alternating current facsimile signals but isolating said control signals, a scanner at each transmitter-recorder comprising facsimile signal generating means and recording means, means to connect either said signal generating means or said recording means to said communication circuit through said isolating means, means for applying a signal to one of said lines when one of said machines is placed in operation as a transmitter, means for initiating operation of said scanner associated with said machine placed in operation as a recorder, said first named signal applying means serving as means for applying a framing signal to said first line in timed relationship with said scanner upon the machine placed in operation as a recorder, and means responsive to reception of a timed signal from the machine operating as a recorder to initiate operation of said scanner, the selective operation of said means for initiating operation of said scanner or said timed signal responsive means being controlled by said means for connecting either said signal generating means or said recording means to said communication circuit.

12. In a facsimile transmission system, a transmitter and a recorder operatively connected for facsimile communication, each machine having a rotary copyholder and driving connections for operating the same, magnetic means at each machine for controlling the associated driving connections, means at the recorder for closing a circuit to generate a framing impulse when the recording copyholder is in a predetermined angular position, and means whereby said framing impulse causes energization of the magnetic means at the transmitter to render the associated driving connections operative.

13. In a facsimile transmission system, a transmitter and a recorder operatively connected for facsimile communication, each machine having a rotary copyholder and driving connections for operating the same, said connections including a controllable clutch member, magnetic means adapted when energized to release said clutch member to operative position, means at the recorder for closing a circuit to generate a framing impulse when the recording copyholder is in a predetermined angular position, and means whereby said framing impulse causes energization of the magnetic clutch-releasing means at the transmitter.

14. In a facsimile transmission system, a transmitter and a recorder operatively connected for facsimile communication, each machine having a rotary copyholder, driving connections for each copyholder, said driving connections being normally inoperative, means at the recorder for rendering the associated driving connections operative, a contact member rotatable in unison with the recording copyholder, a normally open circuit closed by said contact member when it reaches a predetermined angular position, means whereby said closed circuit causes a framing impulse to be sent to the transmitter, and means whereby said framing impulse causes operation of the transmitting copyholder in proper phase relationship with the recording copyholder.

RALEIGH J. WISE.

REFERENCES CITED

The following references are of record in the file of this patent:

UNITED STATES PATENTS

| Number | Name | Date |
| --- | --- | --- |
| 1,804,548 | Vernam | May 12, 1931 |
| 2,059,564 | Dowd | Nov. 3, 1936 |
| 2,098,802 | Finch | Nov. 9, 1937 |
| 2,142,339 | Weaver | Jan. 3, 1939 |
| 2,175,388 | Gurley | Oct. 10, 1939 |
| 2,176,442 | Wise | Oct. 17, 1939 |
| 2,211,232 | Hulfish | Aug. 13, 1940 |